UNITED STATES PATENT OFFICE.

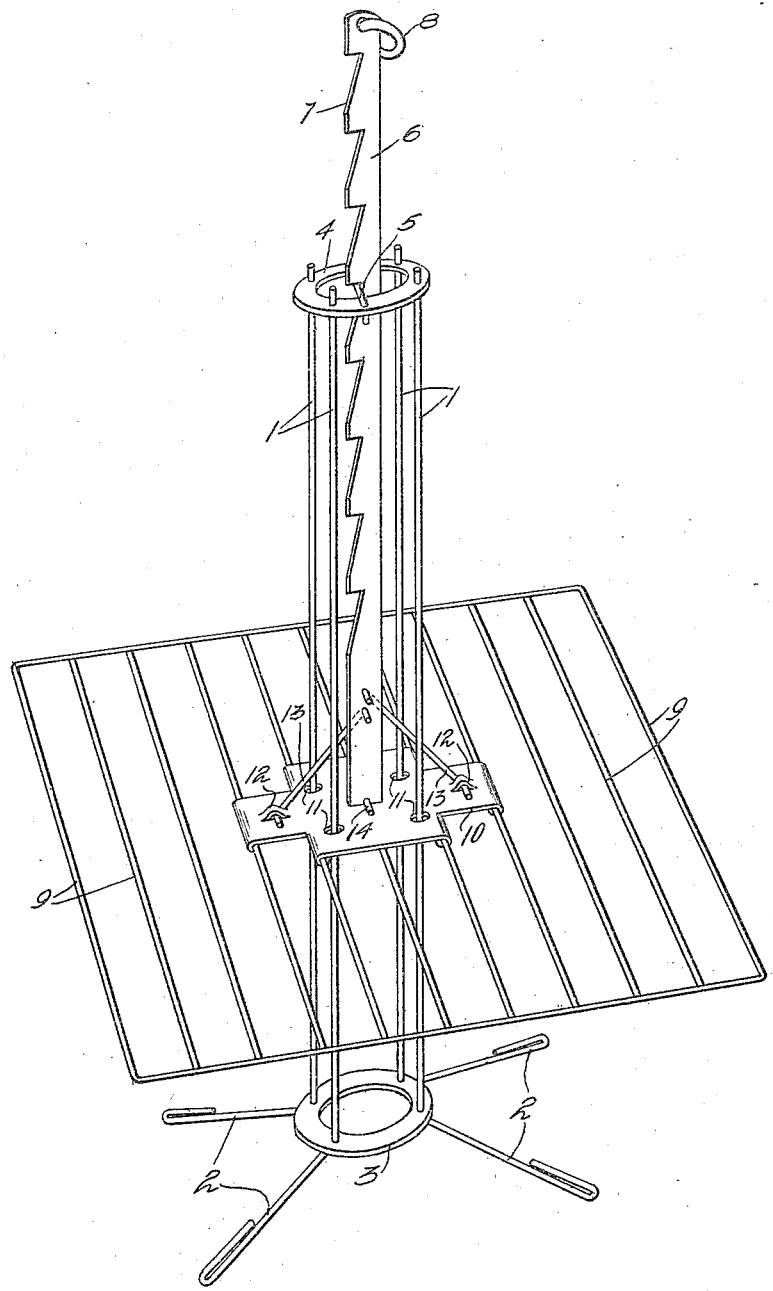

FRANK DUDLEY HANNUM, OF MILES CITY, MONTANA.

TOASTER.

1,234,159.  Specification of Letters Patent.  Patented July 24, 1917.

Application filed April 25, 1917. Serial No. 164,415.

*To all whom it may concern:*

Be it known that I, FRANK DUDLEY HANNUM, a citizen of Great Britain, residing at Miles City, in the county of Custer and State of Montana, have invented certain new and useful Improvements in Toasters, of which the following is a specification.

This invention relates to improvements in toasters and its primary object is to provide means for toasting bread, without danger of burning the same, over a hot fire or a slow fire. A further object is to provide a device of this class that is simple in construction, efficient in operation and cheap to manufacture. With the foregoing and other objects in view the invention consists in the combination and arrangement of parts to be hereinafter fully described, pointed out in the appended claims and illustrated in the accompanying drawing which forms a part of this specification.

The drawing is a perspective view of my improved toaster.

My toaster comprises four wire legs 1 which are bent to form feet 2 to support the structure. The four legs adjacent the feet are connected and braced by a suitable ring 3 which is preferably soldered thereto and at their upper or opposite ends they are connected by another ring 4 which is movable with relation to said legs but prevented from dropping down over said legs by a crimp or shoulder formed in each leg. A rod 5 having its ends disposed in apertures formed in the said ring 4 extends diametrically across said ring and serves to adjustably support the lift bar 6 through engagement with any one of its notches or teeth 7; said lift bar is provided with a ring 8 by means of which it may be raised out of engagement with the said rod 5.

I provide a bread tray 9 formed preferably with the usual spaced wire bars and crimped or clamped thereto is a center plate 10 formed with apertures 11 to receive the said legs 1 and with integral raised lugs 12 to retain the ends of the connecting rods 13 which are fast to the said lift bar 6 whereby said center plate 10 and tray 9 are supported. A pin 14 carried by the said center plate engages with the grooved lower end of said lift bar, which end rests upon said center plate, to center the same upon the plate 10. The bread to be toasted is placed upon the tray 9 and the toaster then placed upon a gas range or stove, the feet 2 resting upon the top of the range or stove. Over a slow fire the tray 9 is lowered with relation to the feet 2 by raising the lift bar out of engagement with the rod 5 and placing a notch 7 nearer the free end of said lift bar in engagement with the said rod. Over a hot fire the tray is raised by reversing the operation just recited.

What is claimed is:—

1. In a toaster, supporting legs spaced apart and terminating in feet, brace rings connecting said legs, a tray, a center plate clamped to said tray and slidably engaging said legs, a toothed lift bar disposed between said supporting legs, connection between said lift bar and center plate, and a rod extending transversely of one of said brace rings for engagement with any of the teeth of said lift bar.

2. In a toaster, supporting legs terminating in feet, brace rings connecting said legs, one of said rings being movable with relation to said legs, a tray, a center plate clamped to said tray and slidably engaging said supporting legs, a toothed terminally grooved lift bar disposed between said supporting legs, the lower end of said lift bar resting upon said center plate, a pin carried by said center plate and engaging the grooved portion of said lift bar, rods connecting said center plate and lift bar, and a rod extending transversely of one of said brace rings for engagement with any of the teeth of said lift bar.

In testimony that I claim the foregoing as my own I have hereto affixed my signature in the presence of two subscribing witnesses.

FRANK DUDLEY HANNUM.

Witnesses:
THOS. BUTLER,
MAX H. FREDERICKS.

Copies of this patent may be obtained for five cents each, by addressing the "Commissioner of Patents, Washington, D. C."